(12) United States Patent
Jackson

(10) Patent No.: US 8,322,138 B2
(45) Date of Patent: Dec. 4, 2012

(54) COMPRESSOR

(75) Inventor: Neville Jackson, Huddersfield (GB)

(73) Assignee: Cummins Turbo Technologies Limited, Huddersfield (GB)

( * ) Notice: Subject to any disclaimer, the term of this patent is extended or adjusted under 35 U.S.C. 154(b) by 0 days.

(21) Appl. No.: 12/818,481

(22) Filed: Jun. 18, 2010

(65) Prior Publication Data

US 2011/0011379 A1 Jan. 20, 2011

Related U.S. Application Data

(63) Continuation of application No. PCT/GB2008/004184, filed on Dec. 12, 2008.

(30) Foreign Application Priority Data

Dec. 18, 2007 (GB) .................................. 0724701.8

(51) Int. Cl.
| | |
|---|---|
| F02B 33/44 | (2006.01) |
| F02B 25/06 | (2006.01) |
| F04D 29/44 | (2006.01) |
| F04D 29/00 | (2006.01) |
| F04D 29/42 | (2006.01) |
| F04D 29/68 | (2006.01) |
| F04D 27/02 | (2006.01) |
| F01M 13/02 | (2006.01) |

(52) U.S. Cl. ....... 60/605.1; 123/572; 123/573; 415/203; 415/196

(58) Field of Classification Search .................. 60/605.1; 123/572–574; 415/196, 120, 211.2, 203–205, 415/206, 228; F01M 13/00, 13/02, 13/04
See application file for complete search history.

(56) References Cited

U.S. PATENT DOCUMENTS 3,041,848 A * 7/1962 Greenwald ................... 415/120
(Continued)

FOREIGN PATENT DOCUMENTS

DE 2532131 A * 2/1977
(Continued)

OTHER PUBLICATIONS

Great Britain Search Report, GB0724701.8, Apr. 2, 2008, Cummins Turbo Technologies Limited.
(Continued)

*Primary Examiner* — Thai Ba Trieu
(74) *Attorney, Agent, or Firm* — Krieg DeVault LLP; Matthew D. Fair

(57) ABSTRACT

A compressor for a turbocharger is supplied with crank case ventilation (CCV) gases from the engine which is turbocharged. The CCV gases are piped into an inlet of the compressor housing which supports an insert with an MWE structure. The MWE structure comprises an outer wall and an inner wall with a gas flow passage defined between them. At high r.p.m. of the compressor impeller air flows through the passage to provide more air volume to the impeller and at low r.p.m. excess air is bled out of the passage for recirculation. The CCV gases are directed to a position upstream of an inlet to the gas flow passage where they emerge through an outlet which may be defined in the insert. The CCV gases may be supplied to the outlet via a chamber defined between the insert and the compressor housing. The arrangement provides for improved mixing of CCV gases with the incoming air and does not compromise noise reduction.

26 Claims, 2 Drawing Sheets

U.S. PATENT DOCUMENTS

| | | | |
|---|---|---|---|
| 3,221,983 A * | 12/1965 | Trickler et al. | 415/211.2 |
| 3,523,743 A * | 8/1970 | Jolette | 415/211.2 |
| 4,676,717 A * | 6/1987 | Willyard et al. | 415/196 |
| 4,743,161 A | 5/1988 | Fisher et al. | |
| 6,164,911 A * | 12/2000 | LeBlanc et al. | 415/228 |
| 7,624,575 B2 * | 12/2009 | Noelle et al. | 60/605.1 |
| 2003/0131596 A1 | 7/2003 | Sumser et al. | 60/611 |
| 2006/0045764 A1 | 3/2006 | Thompson et al. | |
| 2007/0266705 A1 | 11/2007 | Wood et al. | |

FOREIGN PATENT DOCUMENTS

| | | |
|---|---|---|
| DE | 42 13 047 | 4/1992 |
| DE | 4212653 A * | 10/1992 |
| DE | 19754197 A1 * | 6/1999 |
| DE | 10226694 A1 * | 12/2003 |
| JP | 2010112287 A * | 5/2010 |
| WO | WO 2006/026693 | 3/2006 |
| WO | WO 2007/078667 | 7/2007 |
| WO | WO 2009068181 A1 * | 6/2009 |

OTHER PUBLICATIONS

International Search Report, PCT/GB2008/004184, May 19, 2009, Cummins Turbo Technologies Limited.

* cited by examiner

COMPRESSOR

CROSS REFERENCE TO RELATED APPLICATIONS

The present application is a continuation of PCT/GB2008/004184 filed Dec. 12, 2008, which claims priority to United Kingdom Patent Application No. 0724701.8 filed Dec. 18, 2007, each of which is incorporated herein by reference.

BACKGROUND

The present invention relates to a compressor and more particularly, but not exclusively, to a compressor for use in a turbocharger. It also relates to a turbocharger incorporating a compressor.

A compressor comprises an impeller wheel, carrying a plurality of blades (or vanes) mounted on a shaft for rotation within a compressor housing. Rotation of the impeller wheel causes gas (e.g. air) to be drawn into the impeller wheel and delivered to an outlet chamber or passage. In the case of a centrifugal compressor the outlet passage is in the form of a scroll volute defined by the compressor housing around the impeller wheel and an inlet extends in a generally axial direction.

The turbocharger is a well-known device for supplying air to the intake of an internal combustion engine at pressures above atmospheric (boost pressures) and is widely used on automobiles and the like. The compressor of a turbocharger is driven by an exhaust gas turbine that is mounted on a common shaft. Exhaust gas from the internal combustion engine flows through the turbine and drives the turbine wheel in rotation, which, in turn, rotates the compressor impeller. Air is drawn through an axial inlet of the compressor housing and compressed air is delivered to the intake manifold of the internal combustion engine, thereby increasing engine power.

One aspect of turbocharger control is to ensure stable operation by avoiding what is known as surge. If the turbocharger is operating at a relatively low compressor volumetric air flow rate and a high boost pressure the air flow into the compressor may stall and the operation of the compressor is interrupted. Following stall, the air flow tends to reverse through the compressor until a stable pressure ratio is reached at which the air can flow in the correct direction. This process repeats and results in pulsations in the air flow known as surging. Maximum operating efficiency of the engine is achieved by operating close to the surge limit and a surge margin is built into the control process to ensure that the turbocharger operates at a safe distance from the surge condition.

In some turbochargers the compressor inlet has a structure that has become known as a "map width enhanced" (MWE) structure. An MWE structure is described for instance in U.S. Pat. No. 4,743,161. The inlet of such an MWE compressor comprises two coaxial tubular inlet sections, an outer inlet section or wall forming the compressor intake and inner inlet section or wall defining the compressor inducer, or main inlet. The inner inlet section is shorter than the outer inlet section and has an inner surface that is an extension of a surface of an inner wall of the compressor housing which is swept by edges of the impeller wheel blades. The arrangement is such that an annular flow path is defined between the two tubular inlet sections, the path being open at its upstream end and provided with apertures or a slot (hereinafter referred to as the "MWE slot") at its downstream end that communicate with the inner surface of the compressor housing that faces the impeller wheel. In operation, the MWE slot allows additional air to be drawn into the compressor under high flow (near choke) conditions, however its most important function is at lower flow rates and, in particular, as the compressor approaches surge. Under these conditions the MWE slot allows the flow to reverse (which is now the prevalent flow regime in parts of the compressor) and to be re-circulated to the intake, thus delaying surge.

The MWE structure stabilises the performance of the compressor increasing the maximum flow capacity and improving the surge margin, i.e. decreasing the flow at which the compressor surges, so that the range of engine r.p.m. over which the compressor can operate in a stable manner is increased. A given compressor can thus be matched to engines with a wider speed range. This is known as increasing the width of the compressor "map", which is a plot of the compressor characteristic.

During operation of a turbocharged internal combustion engine high pressure combustion gases escape from between the pistons and the cylinders in which they reciprocate into the crankcase. These "blow-by" gases combine with engine oil in the crankcase. It is desirable to release the pressure in the crank case as it will tend to build to such a magnitude that oil will begin to leak past seals such as those around the crankshaft. Historically such crankcase gases have been vented to atmosphere but this is no longer allowed by modern emission regulations and so a crankcase ventilation filter is usually fitted between the vent from the crankcase to remove oil vapour and the gases are recirculated to the air inlet system of the engine for combustion with the usual intake of air and fuel. For a turbocharged engine these crankcase ventilation (CCV) gases are typically fed back into the air inlet upstream of the turbocharger or directly into the turbocharger through a cast boss in the compressor inlet.

It is desirable, in some instances, to have a compressor with an MWE inlet structure and a CCV inlet port. However, such a combination can increase the size of the compressor housing with an extended inlet generally being adopted.

It is one object of the present invention, amongst others, to provide for an improved, or alternative, compressor structure.

SUMMARY

According to a first aspect of the present invention there is provided a compressor comprising a housing having an inlet and an outlet, a volume between the inlet and outlet for receiving a impeller wheel rotatable about an axis of rotation; the housing having an inner wall defining a surface over which, in use, radially outer edges of the impeller sweep as the impeller wheel rotates about its axis; the inlet comprising a first tubular wall extending away from the impeller wheel in an upstream direction and forming a gas intake portion of the inlet and a second tubular wall extending away from the impeller wheel in an upstream direction within the first tubular wall and defining an inducer portion of the inlet and a gas flow passage defined between the first and second tubular walls, the gas flow passage being in fluid communication with the impeller wheel; a crankcase gas ventilation (CCV) conduit having at least a portion that is axially coincident with at least a portion of the gas passage and having a CCV outlet for delivering CCV gases to the intake upstream of the gas flow passage.

The CCV conduit may be defined in the housing.

The inlet may comprise an outer wall defined by the housing with the first tubular wall of the inlet being disposed inside the outer wall. The outer wall and the first and second walls may be substantially concentric.

The CCV conduit may be defined at least in part by a port that is defined in the outer wall of the inlet. The port may penetrate a boss defined on the outer wall of the inlet and it may support a duct for connection to the crank case of an internal combustion engine to which the compressor may be connected.

The gas flow passage may have an upstream end (distal from the impeller volume) and a downstream end (proximate the inner surface of the housing). The CCV conduit outlet may be disposed adjacent to the upstream end of the gas flow passage.

The gas flow passage may be substantially annular.

There may be a passage or chamber defined between the outer wall of the housing and the first tubular wall, the CCV conduit being at least partly defined by the passage or chamber. The CCV gases are thus delivered to the passage or chamber and then to the intake via the CCV outlet which is defined by the passage or chamber. The passage or chamber may be substantially annular and radially offset from the gas passage with at least part of it axially coincident with at least part of the gas flow passage. The passage or chamber may be substantially coaxial and/or concentric with the annular gas flow passage. The CCV outlet may be defined at one end of the passage or chamber and it may be defined in the first tubular wall of the inlet.

The passage or chamber may be in fluid communication with the CCV port. It may in fact be directly connected. The CCV conduit may comprise the port in the outer wall of the inlet which leads into the passage or chamber between the outer wall and the first tubular wall of the inlet.

There may be provided a removable insert in the inlet, the insert defining the first and second tubular walls. The CCV conduit may be defined at least in part between the insert and the inlet. The insert may be substantially cylindrical. It may have an upstream end (distal from the impeller volume) and a downstream end (proximal the inner surface of the housing). The upstream end of the first tubular wall may have at least one port that defines the CCV conduit outlet. The, or each, port that defines the CCV conduit outlet may extend in a substantially radial direction. Alternatively the, or each, port may extend in a direction that is inclined at an acute angle to the radial so as to direct CCV gases towards the impeller.

The port may be in the form of one or more generally cylindrical bores through the first tubular wall. However, it may take any suitable form including, for example, a generally annular slot which may be discontinuous.

The insert may be supported in the inlet by at least one rib defined on an outer surface of the insert. There may be more than one rib with the chamber or passage being defined between the ribs. A first rib may be provided at or adjacent to an upstream end of the insert and a second rib may be provided at or adjacent to a downstream end of the insert.

An upstream end of the first tubular wall may be inwardly tapered towards the axis of rotation. This serves as a convergent nozzle and assists in the extraction of the CCV gases. Similarly an upstream end of the second tubular wall may be inwardly tapered towards the axis of rotation.

According to a second aspect of the present invention there is provided a turbocharger having a compressor as defined above. According to a third aspect of the present invention there is provided an internal combustion engine fitted with such a turbocharger, the engine having a crank case with a ventilation port connected to the CCV conduit of the compressor so as to provide crank case ventilation.

BRIEF DESCRIPTION OF THE FIGURES

A specific embodiment of the present invention will now be described, by way of example only, with reference to the accompanying drawings, in which.

DETAILED DESCRIPTION OF REPRESENTATIVE EMBODIMENTS

Figure 1:
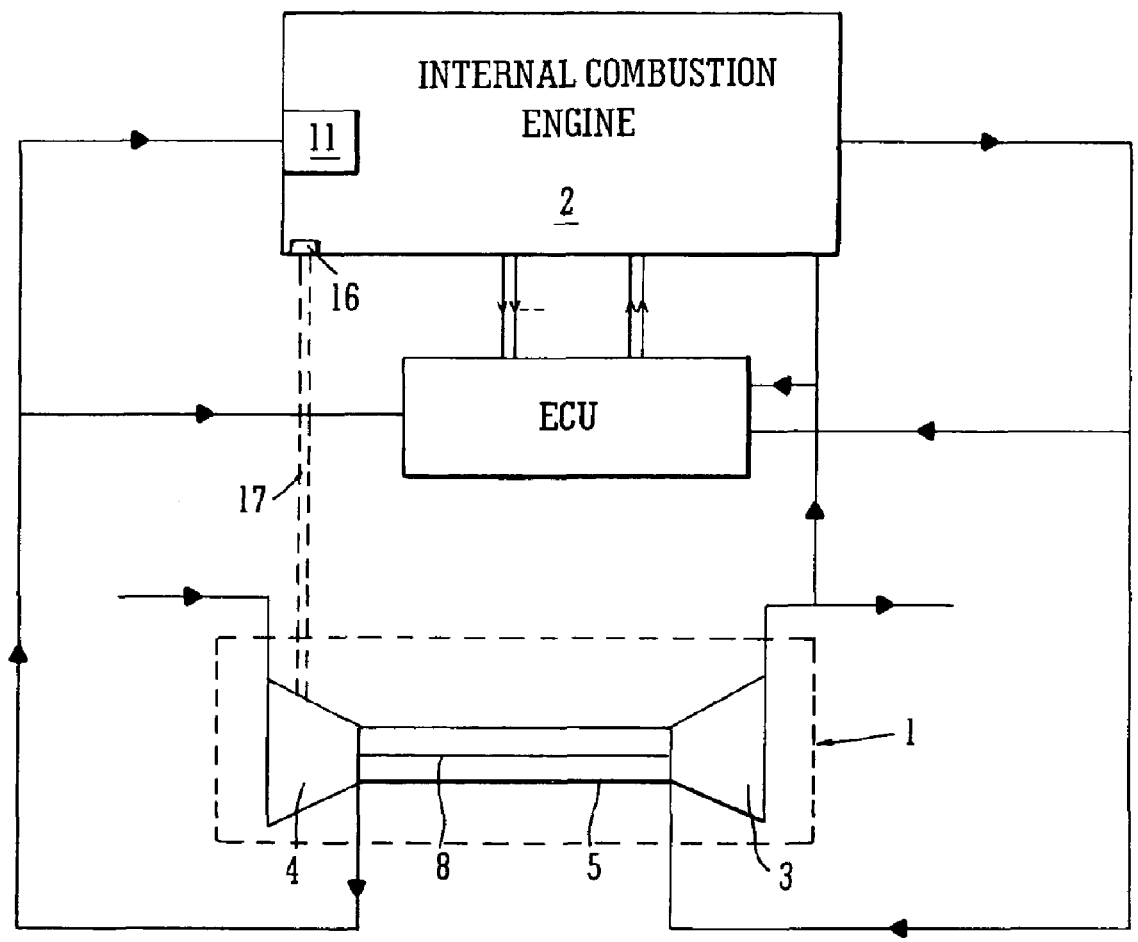
FIG. 1 is a schematic representation of a turbocharger connected to an internal combustion engine and fitted with a compressor in accordance with the present invention.

Referring to now to the drawings, FIG. 1 shows the turbocharger 1 connected to an internal combustion engine 2 of a vehicle. The operation of the engine 2 and the turbocharger 1 is controlled by an on-board ECU (engine control unit) the usual manner.

The turbocharger 1 comprises a turbine 3 connected to a compressor 4 via a central bearing housing 5. The compressor 4, which is shown in more detail in FIGS. 2 to 4, comprises a compressor housing 6 within which an impeller wheel 7 (represented schematically in dotted line in FIG. 4, but not shown in FIGS. 2 and 3) is rotatably supported at one end of a turbocharger shaft 8. The compressor impeller wheel 7 comprises a hub from which a plurality of blades extends outwardly. The turbine 3 similarly comprises a turbine wheel (not shown) that is rotatably supported on the other end of the shaft 8 within a turbine housing that is connected to the compressor housing 6 via the bearing housing 5. Since the invention relates to the structure of the compressor 4, there will be no detailed description of the turbine or bearing housing components.

Figure 2:
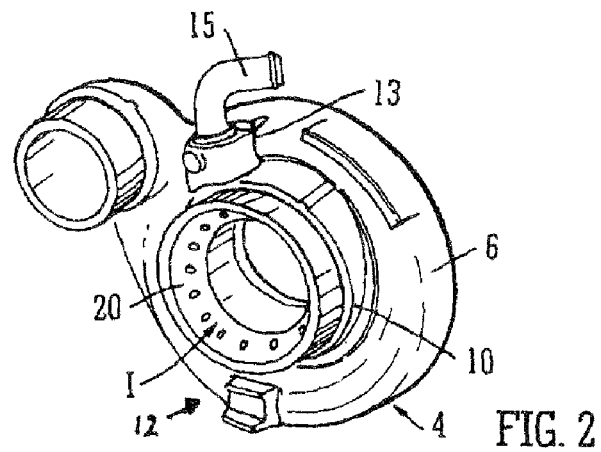
FIG. 2 is a perspective view of a compressor in accordance with the present invention.
Figure 3:
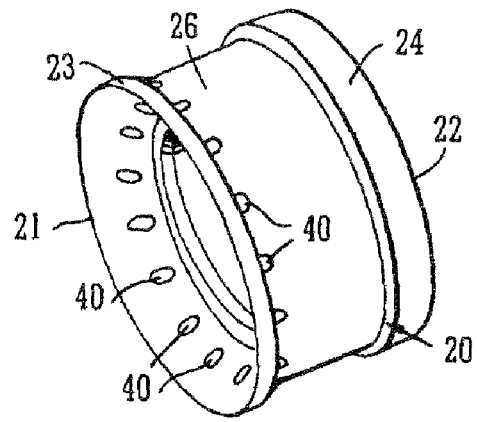
FIG. 3 is a perspective view of a noise reduction insert of the compressor of FIGS. 2 and 4.
Figure 4:
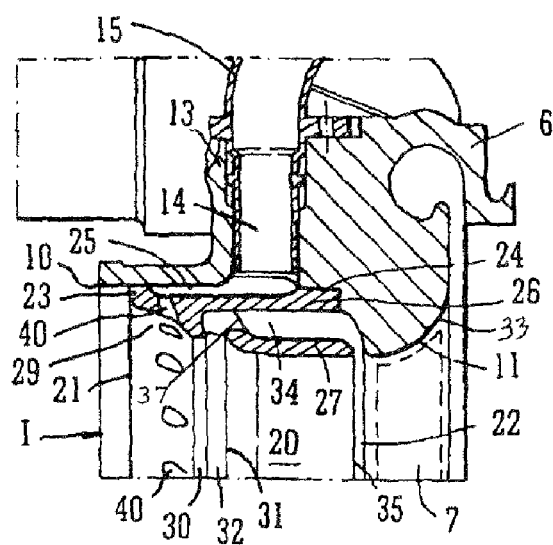
FIG. 4 is an axial cross-section of part of the compressor of FIG. 2.

The compressor housing 6 in the embodiment of FIGS. 2 to 4 is of unitary cast construction although it will be understood that it may be comprised of multiple parts. It has an axially extending generally cylindrical wall 10 that forms an outer section of the compressor inlet I and through which air is delivered to the impeller wheel, an impeller wheel volume 11 and an outlet volute 12 surrounding the impeller wheel to which the compressed air is delivered in a generally radial direction from the impeller wheel 7. The outer section of the inlet has an integral boss 13 that is penetrated by a substantially radially extending CCV inlet port 14 for delivering CCV gases into the compressor inlet I. A pipe 15 is supported in the port for connection to a CCV gas outlet 16 (FIG. 1) of the internal combustion engine 2 via a suitable hose 17.

The cylindrical wall 10 of the compressor housing 6 supports a one-piece injection moulded insert 20 that provides an MWE (map-width enhanced) inlet structure. The insert 20 is generally cylindrical with upstream and downstream ends 21, 22 each of which has an outwardly projecting annular rib 23, 24 by which the insert is supported on the inside surface of the cylindrical wall 10 of the housing 6. A shallow annular chamber 25 is defined between the cylindrical wall 10 of the housing and the insert 20 and extends in an axial direction between the two ribs 23, 24. It is here where the CCV inlet port 14 emerges.

In the embodiment shown in FIGS. 2 to 4, the MWE inlet structure provided by the insert 20 comprises two substantially coaxial tubular inlet walls: an outer inlet wall 26 forming the compressor intake and inner inlet wall 27 defining the compressor inducer, or main inlet. The upstream end of the outer wall 26 of the MWE inlet structure has an inner surface that is inwardly tapered at 29 to an annular edge 30. The inner inlet wall 27 is axially shorter than the outer inlet wall 26 with an upstream end 31 that is axially spaced from the annular edge 30 of the outer wall so as to define a first axial gap 32 and which is tapered radially inwardly for a short axial length so as to provide a convergent nozzle that assists in the flow of the CCV gases from the port to the inlet. The inner inlet wall 27 has an inner surface that effectively forms a continuation of a shroud surface 33 of an inner wall of the compressor housing which is swept by edges of the impeller wheel blades. The arrangement is such that an annular flow passage 34 is defined between the two tubular inlet walls 26, 27, the passage being open at its upstream end by virtue of the first axial gap 32 and open at its downstream end by virtue of a second axial gap 35 between the downstream end of the inner wall 27 and the shroud surface 33 of the compressor housing 6 that faces the impeller wheel 7.

In operation, at relatively high r.p.m. of the impeller wheel the pressure in the compressor housing falls below atmosphere and air flows in through the first axial gap 32 along the annular flow passage 34 thus increasing the volume of air being compressed by the impeller. At relatively low r.p.m. excess air tends to bleed out of the impeller volume 11 through the second axial gap 35, along the annular flow path 34 and is recirculated to the intake.

The MWE inlet structure stabilises the performance of the compressor increasing the maximum flow capacity and improving the surge margin, i.e. decreasing the flow at which the compressor surges, so that the range of engine r.p.m. over which the compressor can operate in a stable manner is increased. A given compressor can thus be matched to engines with a wider speed range. This is known as increasing the width of the compressor "map", which is a plot of the compressor characteristic.

The first and second axial gaps 32, 35 may each or both be in the form of a discontinuous slot if supporting formations 37 are provided between the two edges of the gaps. For example struts may be provided between the outer surface of the inner wall 27 and the inner surface outer wall 26 at the upstream end and/or struts may be provided between the outer surface of the inner wall and the housing at the downstream end.

The upstream end of the outer wall 26 is penetrated by a plurality of substantially cylindrical ports 40 that are equi-angularly spaced around the insert 20. These serve to provide fluid communication between the inducer and intake parts of the inlet I and the annular chamber 25. The ports 40 are disposed at a slight (acute) inclination to the radial direction such that gas in the annular chamber is directed into the intake.

In operation, the CCV gases are filtered (to remove oil and particulates) and then delivered by the duct 15 through the CCV port 14 to the annular chamber 25 where they flow in a generally axial direction (but having circumferential and radial components) towards the ports 40 in the upstream end of the insert 20. The gases egress through the ports 40 and emerge in the inlet upstream of the MWE annular flow passage 34. The angle of inclination of the ports 40 is such that they do not impede the main air flow being drawn into the inlet and through the MWE passage but encourage the mixing of the CCV gas and the air. This means that no significant noise is generated. The reduction in cross-section of the inlet provided by the tapered inner surface 29 of the insert 20 at the upstream end of the outer wall 26 and at the upstream end of the inner wall 27 serves to create a pressure differential that helps to draw the CCV gases into the inlet in the manner of a convergent nozzle. The taper also serves as a noise reduction baffle.

The axially extending annular chamber 25 outboard of the outer wall 26 keeps the CCV gases separate from the flow in the MWE passage and directs them to a suitable location upstream of the MWE passage. This allows the CCV port to be disposed over the MWE passage rather than having to be axially offset therefrom and so provides for a more compact arrangement.

It will be appreciated that numerous modifications to the above described designs may be made without departing from the scope of the invention as defined in the appended claims. For example, the insert 20 could be replaced by an integrally formed structure cast, machined or otherwise formed in the housing. The ports providing communication between the annular chamber and the intake can be of any suitable form including one or more slots or a discontinuous slot. The annular chamber can also be of any suitable form serving as a passage for providing fluid communication between the CCV port and the intake.

The invention claimed is:

1. A compressor comprising a housing having an inlet and an outlet, a volume between the inlet and outlet for receiving a impeller wheel rotatable about an axis of rotation; the housing having an inner wall defining a surface over which, in use, radially outer edges of the impeller sweep as the impeller wheel rotates about its axis;
the inlet comprising a first tubular wall extending away from the impeller wheel in an upstream direction and forming a gas intake portion of the inlet and a second tubular wall extending away from the impeller wheel in an upstream direction within the first tubular wall and defining an inducer portion of the inlet and a gas flow passage defined between the first and second tubular walls, the gas flow passage being in fluid communication with the impeller wheel; and a crankcase gas ventilation (CCV) conduit having at least a portion that is radially offset from and axially coincident with at least a portion of a substantially axially extending portion of the gas flow passage and having a CCV outlet for delivering CCV gases to the intake upstream of the gas flow passage.

2. The compressor according to claim 1, wherein the CCV conduit comprises a substantially annular chamber that extends in a substantially axial direction.

3. The compressor according to claim 2, wherein the inlet further comprises an outer wall defined by the housing, the first tubular wall of the inlet being disposed inside the outer wall.

4. The compressor according to claim 3, wherein the CCV conduit comprises an inlet port that is defined in the outer wall of the inlet and is in fluid communication with the substantially annular chamber.

5. The compressor according to claim 4, wherein the insert is supported in the inlet by at least one rib defined on an outer surface of the insert.

6. The compressor according to claim 5, wherein a first rib is provided at or adjacent to an upstream end of the insert and a second rib is provided at or adjacent to a downstream end of the insert.

7. The compressor according to claim 1, wherein there is provided a removable insert in the inlet, the insert defining the first and second tubular walls.

8. The compressor according to claim 7, wherein the insert is substantially cylindrical.

9. The compressor according to claim 1, wherein an upstream end of the first tubular wall has at least one port that defines the CCV outlet.

10. The compressor according to claim 9, wherein the at least one port that defines the CCV outlet extends in a substantially radial direction.

11. The compressor according to claim 9, wherein the at least one port that defines the CCV outlet extends in direction that is inclined at an acute angle to the radial so as to direct CCV gases towards the impeller.

12. The compressor according to claim 1, wherein an upstream end of the first tubular wall is inwardly tapered towards the axis of rotation.

13. The compressor according to claim 1, wherein an upstream end of the second tubular wall is inwardly tapered towards the axis of rotation.

14. The compressor according to claim 1, wherein the gas flow passage has an upstream end and a downstream end, the upstream end communicating with the intake or inducer portion and the downstream end communicating with the surface.

15. The compressor according to claim 14, wherein the upstream end communicates with the intake or inducer portion through at least one first aperture and wherein the downstream end communicates with the surface through at least one second aperture.

16. The compressor according to claim 1, wherein the CCV conduit comprises a CCV inlet port that is axially coincident with at least a portion of the substantially axially extending portion of the gas flow passage.

17. A compressor comprising a housing having an inlet and an outlet, a volume between the inlet and outlet for receiving a impeller wheel rotatable about an axis of rotation; the housing having an inner wall defining a surface over which, in use, radially outer edges of the impeller sweep as the impeller wheel rotates about its axis; the inlet comprising a first tubular wall extending away from the impeller wheel in an upstream direction and forming a gas intake portion of the inlet and a second tubular wall extending away from the impeller wheel in an upstream direction within the first tubular wall and defining an inducer portion of the inlet and a gas flow passage defined between the first and second tubular walls, the gas flow passage being in fluid communication with the impeller wheel; and a crankcase gas ventilation (CCV) conduit having at least a portion that is radially offset from and axially coincident with at least a portion of a substantially axially extending portion of the gas flow passage and having a CCV outlet for delivering CCV gases to the intake upstream of the gas flow passage, wherein the inlet further comprises an outer wall defined by the housing, the first tubular wall of the inlet being disposed inside the outer wall.

18. A compressor comprising a housing having an inlet and an outlet, a volume between the inlet and outlet for receiving a impeller wheel rotatable about an axis of rotation; the housing having an inner wall defining a surface over which, in use, radially outer edges of the impeller sweep as the impeller wheel rotates about its axis; the inlet comprising a first tubular wall extending away from the impeller wheel in an upstream direction and forming a gas intake portion of the inlet and a second tubular wall extending away from the impeller wheel in an upstream direction within the first tubular wall and defining an inducer portion of the inlet and a gas flow passage defined between the first and second tubular walls, the gas flow passage being in fluid communication with the impeller wheel; and a crankcase gas ventilation (CCV) conduit having at least a portion that is radially offset from and axially coincident with at least a portion of the gas flow passage and having a CCV outlet for delivering CCV gases to the intake upstream of the gas flow passage;
wherein there is provided a removable insert in the inlet, the insert defining the first and second tubular walls.

19. The compressor according to claim 18, wherein the insert is substantially cylindrical.

20. A compressor comprising a housing having an inlet and an outlet, a volume between the inlet and outlet for receiving a impeller wheel rotatable about an axis of rotation; the housing having an inner wall defining a surface over which, in use, radially outer edges of the impeller sweep as the impeller wheel rotates about its axis; the inlet comprising a first tubular wall extending away from the impeller wheel in an upstream direction and forming a gas intake portion of the inlet and a second tubular wall extending away from the impeller wheel in an upstream direction within the first tubular wall and defining an inducer portion of the inlet and a gas flow passage defined between the first and second tubular walls, the gas flow passage being in fluid communication with the impeller wheel; and a crankcase gas ventilation (CCV) conduit having at least a portion that is radially offset from and axially coincident with at least a portion of the gas flow passage and having a CCV outlet for delivering CCV gases to the intake upstream of the gas flow passage;
wherein:
an upstream end of the first tubular wall has at least one port that defines the CCV outlet; and
the at least one port that defines the CCV outlet extends in direction that is inclined at an acute angle to the radial so as to direct CCV gases towards the impeller.

21. A compressor comprising a housing having an inlet and an outlet, a volume between the inlet and outlet for receiving a impeller wheel rotatable about an axis of rotation; the housing having an inner wall defining a surface over which, in use, radially outer edges of the impeller sweep as the impeller wheel rotates about its axis; the inlet comprising a first tubular wall extending away from the impeller wheel in an upstream direction and forming a gas intake portion of the inlet and a second tubular wall extending away from the impeller wheel in an upstream direction within the first tubular wall and defining an inducer portion of the inlet and a gas flow passage defined between the first and second tubular walls, the gas flow passage being in fluid communication with the impeller wheel; and a crankcase gas ventilation (CCV) conduit having at least a portion that is radially offset from and axially coincident with at least a portion of the gas flow passage and having a CCV outlet for delivering CCV gases to the intake upstream of the gas flow passage;
wherein:
the CCV conduit comprises a substantially annular chamber that extends in a substantially axial direction;
the inlet further comprises an outer wall defined by the housing, the first tubular wall of the inlet being disposed inside the outer wall;
the CCV conduit comprises an inlet port that is defined in the outer wall of the inlet and is in fluid communication with the substantially annular chamber; and
the insert is supported in the inlet by at least one rib defined on an outer surface of the insert.

22. The compressor according to claim 21, wherein a first rib is provided at or adjacent to an upstream end of the insert and a second rib is provided at or adjacent to a downstream end of the insert.

23. A turbocharger having a compressor comprising a housing having an inlet and an outlet and a volume between the inlet and outlet for receiving a impeller wheel rotatable about an axis of rotation, wherein the inlet has a gas intake portion and an inducer portion; the housing having an inner wall defining a surface over which, in use, radially outer edges of the impeller sweep as the impeller wheel rotates about its axis; the inlet comprising a first tubular wall extending away from the impeller wheel in an upstream direction and forming the gas intake portion of the inlet and a second tubular wall extending away from the impeller wheel in an upstream direction within the first tubular wall and defining the inducer portion of the inlet and a gas flow passage defined between the first and second tubular walls, the gas flow passage being in fluid communication with the impeller wheel; and a crankcase gas ventilation (CCV) conduit having at least a portion that is radially offset from and axially coincident with at least a portion of a substantially axially extending portion of the gas flow passage and having a CCV outlet for delivering CCV gases to the intake upstream of the gas flow passage.

24. The turbocharger according to claim 23, wherein the gas flow passage has an upstream end and a downstream end, the upstream end communicating with the intake or inducer portion and the downstream end communicating with the surface.

25. The turbocharger according to claim 24, further comprising supporting formations provided between the inner wall and the outer wall at the upstream end, at the downstream end or at the upstream and downstream ends.

26. An internal combustion engine fitted with a turbocharger, the turbocharger having a compressor comprising a housing having an inlet and an outlet, a volume between the inlet and outlet for receiving a impeller wheel rotatable about an axis of rotation; the housing having an inner wall defining a surface over which, in use, radially outer edges of the impeller sweep as the impeller wheel rotates about its axis; the inlet comprising a first tubular wall extending away from the impeller wheel in an upstream direction and forming a gas intake portion of the inlet and a second tubular wall extending away from the impeller wheel in an upstream direction within the first tubular wall and defining an inducer portion of the inlet and a gas flow passage defined between the first and second tubular walls, the gas flow passage being in fluid communication with the impeller wheel; and a crankcase gas ventilation (CCV) conduit having at least a portion that is radially offset from and axially coincident with at least a portion of a substantially axially extending portion of the gas flow passage and having a CCV outlet for delivering CCV gases to the intake upstream of the gas flow passage, the engine having a crank case with a ventilation port connected to the CCV conduit of the compressor so as to provide crank case ventilation.

* * * * *